United States Patent
Paine, III

(10) Patent No.: US 6,789,547 B1
(45) Date of Patent: Sep. 14, 2004

(54) CARBON TECHNOLOGY

(75) Inventor: John B. Paine, III, Midlothian, VA (US)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 10/003,225

(22) Filed: Oct. 30, 2001

Related U.S. Application Data

(60) Provisional application No. 60/244,396, filed on Oct. 31, 2000.

(51) Int. Cl.[7] .......................... A24B 15/18; B01J 20/00
(52) U.S. Cl. ..................... 131/334; 131/202; 131/342; 131/331; 502/400; 502/416
(58) Field of Search ................................ 502/400, 416, 502/423, 5, 180; 131/334, 202, 361, 331, 333, 335, 342, 360

(56) References Cited

U.S. PATENT DOCUMENTS

| | | | | |
|---|---|---|---|---|
| 1,559,054 A | * | 10/1925 | Smith | 502/423 |
| 3,355,317 A | * | 11/1967 | Keith et al. | 117/100 |
| 3,724,469 A | * | 4/1973 | Reynolds et al. | 131/266 |
| 3,890,245 A | * | 6/1975 | Berg et al. | 502/5 |
| 4,266,561 A | * | 5/1981 | Litzinger | 131/341 |
| 5,126,297 A | * | 6/1992 | Hardison et al. | 502/62 |
| 5,540,759 A | * | 7/1996 | Golden et al. | 95/138 |
| 6,455,159 B1 | * | 9/2002 | Walker et al. | 428/408 |

FOREIGN PATENT DOCUMENTS

DE 218075 * 1/1985

OTHER PUBLICATIONS

Merrian–Wedbster,s Collegiate Dictionary, 10th Ed, p. 584, 1998.*
Low Temperature Oxidation, Etc., Part II, CCXL.—Low Temperature Oxidation at Charcoal Surfaces. Part II. The Behavior of Charcoal in the Presence of Promoters. Eric Keightley Rideal and Winifred Mary Wright. pp. 1813–1821. May 3, 1926.
Novel Technologies for the Abatement of Phosphine. John B. Paine III, Charles R. Howe, Kenneth F. Podraza, William B. Edwards III, and Charles T. Bridges. pp. 305–314, Nov. 16, 1998.

* cited by examiner

Primary Examiner—Dionne A. Walls
(74) Attorney, Agent, or Firm—Connolly Bove Lodge & Hutz LLP

(57) ABSTRACT

Catalytically active carbons are used in cigarette filters for selective oxidation of selected gas phase components in cigarette smoke. The carbons are impregnated with transition metals and sulfur and/or nitrogen ligation. The catalytic activity of the carbon is significantly improved by introducing catalytically active sites by heat treatment in the range of 500–1000° C. in the presence of transition metals and nitrogenous or sulfurous materials. Furthermore, introduction of such metalliferous sites into a active carbon can improve the absorptive affinity of the active carbon for classes of compounds, including aliphatic dienes and aromatic hydrocarbons.

6 Claims, 1 Drawing Sheet

CARBON TECHNOLOGY

CROSS REFERENCE TO RELATED APPLICATION

The present application relates to provisional application serial No. 60/244,396 filed Oct. 31, 2000, and full benefit of that application is claimed.

BACKGROUND OF THE INVENTION

The present invention relates to carbon technology, and more particularly to highly activated carbons and the use of such carbons in cigarette filters to selectively oxidize or adsorb selected gas phase components.

Certain activated carbons offered commercially show "intrinsic catalytic activity" for oxidation of toxic gaseous molecules such as phosphine, hydrogen sulfide, arsine or sulfur dioxide, to products which form a condensed phase that remains adhering to the carbon. Such carbons include Calgon Carbon Corporation's CENTAUR® carbon (see U.S Pat. No. 5,356,849, granted Oct. 18, 1994; U.S. Pat. No. 5,444,031, granted Aug. 22, 1995; U.S. Pat. No. 5,464,605, granted Nov. 7, 1995; and U.S. Pat. No. 5,674,462, granted Oct. 7, 1997; all incorporated herein by reference), and NORIT Americas' Vapure 610, 612 or 610P line of carbons. These carbons are both made from coal but by very different processes. CENTAUR® specifically attempts to incorporate nitrogen into the structure by high-temperature treatment with nitrogenous substances such as ammonia or urea. NORIT Vapure has no such explicit nitrogen thermal treatments; however, the intrinsic nitrogen content of the source coal may be sufficient to leave enough in the final product, given an appropriate set of manufacturing conditions. One feature that both carbons have in common that sets them apart from carbons made from coconut shells or wood (for example), is a substantial content of metals (often referred to by the catch-all phrase "ash"). Carbon manufacturers have a significant under-appreciation of the importance of the specific ash components to catalytic activity. Moreover, such producers of activated carbons have a limited understanding of the precise mechanistic details underlying "intrinsic catalytic activity" of carbons so favored with such properties. Of the various metals found by PIXE analysis to occur in either carbon to extents of hundreds or thousands of parts per million, the one that dominates both is iron. Iron content of either CENTAUR® or NORIT Vapure typically ranges from 0.2 to 0.4% metal by weight.

SUMMARY OF THE INVENTION

In accordance with the present invention, catalytically active carbon impregnated with heavy metal is used as a filter element for cigarettes and the selective adsorption and/or oxidation of selected gas phase components in cigarette smoke. The carbons are impregnated with heavy metals and sulfur or nitrogen ligation, and the activity of such carbons is significantly improved by introducing catalytically active sites by heat treatments in the range of 500–1000° C. in the presence of heavy metals and nitrogenous materials.

BRIEF DESCRIPTION OF THE DRAWING

Novel features and advantages of the present invention in addition to those mentioned above will become apparent to persons of ordinary skill in the art from a reading of the following detailed description in conjunction with the accompany drawing wherein similar reference characters identify similar parts and in which.

DETAILED DESCRIPTION OF THE INVENTION

Figure 1:
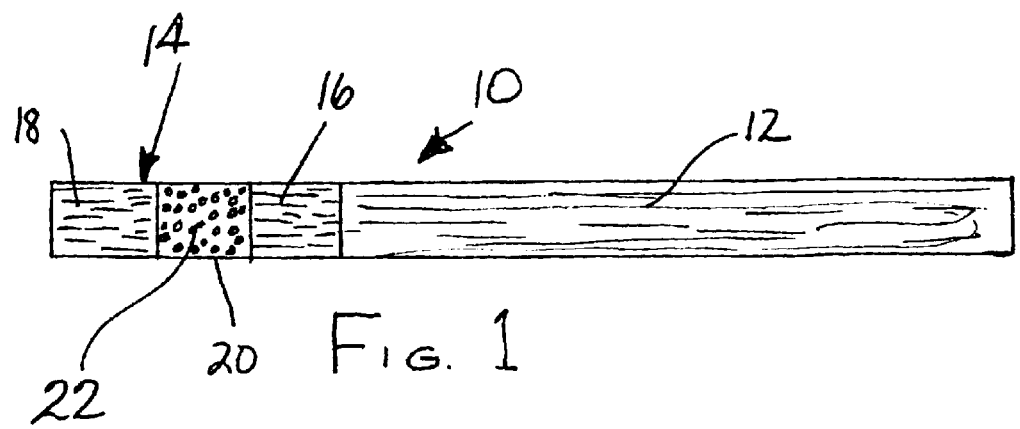
FIG. 1 is a longitudinal cross-sectional view of a cigarette and filter, according to the present invention.

Referring in more particularly to the drawing, FIG. 1 shows a cigarette 10 comprising a tobacco rod 12 in combination with a plug-space-plug filter 14. Inner plug 16 and outer plug 18 of filter 14 both comprise cellulose acetate, and space 20 between the plugs is filled with catalytically active carbon 22 impregnated with at least one heavy metal, as explained more fully below. Mainstream tobacco smoke from tobacco rod 12 passes through the catalytically active carbon 22 to selectively adsorb, or selectively oxidize and absorb selected gas phase components in the smoke.

Figure 2:
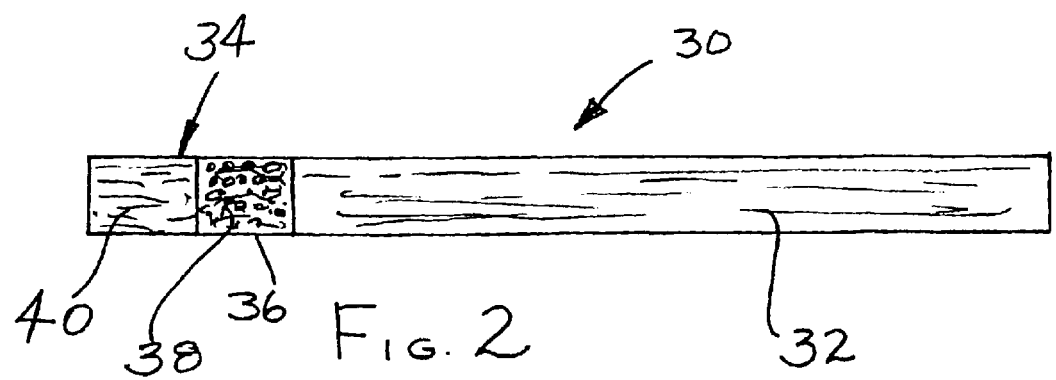
FIG. 2 is a longitudinal cross-sectional view of another cigarette and filter, according to the present invention.

FIG. 2 shows a cigarette 30 comprising a tobacco rod 32 with a combined plug filter 34 comprising an inner plug 36 of cellulose acetate and catalytically active carbon 38 impregnated with at least one heavy metal, as explained more fully below. End plug 40 of combined filter 34 may comprise cellulose acetate. Mainstream tobacco smoke from tobacco rod 32 passes through the catalytically active carbon 38 to selectively adsorb or selectively oxidize and adsorb selected gas phase components in the smoke.

Intrinsically active catalytic carbons function as internally short-circuited batteries or fuel cells. Different regions of the carbons (whose internal structure is related to that of graphite) have different oxidation potentials, and can function as electrodes of different potential. Graphitic carbon is electrically conducting, and can provide one of the two "wires" joining the two electrodes. The other "wire" must be provided by ah electrolyte, an aqueous phase or film on the surface of the carbon, that, by virtue of a content of ions, can conduct or move protons (H⊕) electrically, so as to complete the circuit. Such an electrolyte conducts electricity by the net movement of charged ions. As noted below, a movement of hydrogen cations can be envisioned, since one electrode (the oxygen electrode) consumes hydrogen cation, whereas the other electrode generates hydrogen cation.

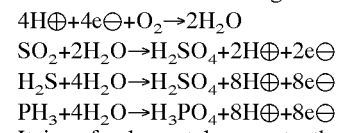

It is a fundamental property that carbons of the CENTAUR® and Vapure type exert maximal catalytic activity in the presence of water vapor or loaded water content, consistent with the "battery hypothesis." One of the electrodes may be provided by the bulk carbon, as an "oxygen electrode", to operate the half-reaction: $4H\oplus+4e\ominus+O_2\rightarrow 2H_2O$. This is a reaction promoted by the presence of acid on the carbon. For the other electrode, the reactions may be:

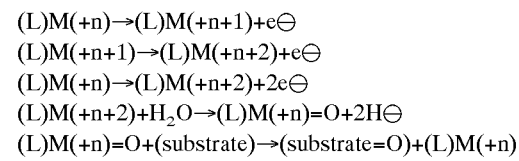

The active site functions as an electrode as it is being regenerated to its most oxidized active form. It then sits there as a reagent, awaiting a substrate molecule.

Alternatively, the metal site may bind the targeted substrate (e.g. phosphine or hydrogen sulfide, or even carbon monoxide), and the bound form serves as the electrode to give up electrons towards the oxygen electrode, e.g. in the case of hydrogen sulfide:

(L)M(+n)+$H_2$S→(L)M(+n)($H_2$S) (binding step)

(L)M(+n)($H_2$S)→(L)M(+n)=S+2H⊕+2e⊖

(L)M(+n)=S+$H_2$O→(L)M(+n)=S=O+2H⊕+2e⊖

(L)M(+n)=S=O+$H_2$O→(L)M(+n)=S(=O)$_2$+2H⊕+2e⊖

(L)M(+n)=S(=O)$_2$+$H_2$O→(L)M(+n)+S(=O)$_3$+2H⊕+2e⊖.

In all of the above, M is a metal ion incorporated within the graphitic sheets of the activated carbon so as to be in intimate electronic and electrical contact with the graphitic sheets. L is a ligand to the metal provided by the graphitic sheet. In the equations above, for M(+n), M(+n+1) and M(+n+2), +n(etc) represents the net charge exhibited by the electrode site, rather than the "oxidation state" of metal M since part of the charge resulting from the oxidation state is compensated for by ligand L. Additionally, "n" may be a integer, positive or negative, or zero. Based on a knowledge of chemistry and the constituents of the source coal, L consists of as many as four atoms, of such elements as carbon, nitrogen or sulfur, but most particularly of nitrogen, four of which in an approximately square arrangement can provide a chelating pocket similar to that found in a porphyrin or phthalocyanin. One way to test a porphyrin-like active site is to test its activity in the presence of cyanide or carbon monoxide, in case either of these should deactivate the catalyst. Unlike a simple porphyrin, however, the carbon has enormous reserves of oxidizing power to be called on to oxidize any intruding molecule, due to the electrical conductivity of the whole.

Such pockets of ligated metals in coal-based carbons may have indeed started out as porphyrin molecules in the source coal (coal typically does contain porphyrins derived from the breakdown of primordial chlorophyll). The thermal treatment of coals enroute to activated carbon may well fuse the porphyrin structures into the graphite sheets, forming a continuous nearly-coplanar array. A small amount of buckling of the graphite sheets would be needed to allow a porphyrin to fit in properly, but the effect would be one of near coplanarity, and excellent electrical conductance between graphite sheet and the included porphyrin-like array.

It may be that Calgon's thermal nitrogen treatments enhance the concentration of porphyrin-like active sites, incorporating the metals intrinsic to the source-coal. In the model above, it is understood that each particle has a multitude of individual "electrodes", and that these are short-circuited amongst each other. Each particle of carbon functions as a multitude of complete battery or fuel cell systems; in the case of a fuel cell, oxygen and a substrate to be oxidized must be provided to the carbon particles.

In accordance with the present invention, catalytically active sites of the "porphyrin" type are introduced in the formation process to carbons that would otherwise have few or no such sites, by heat treatments in the temperature range of 500 to 1000° C. of the activated carbon precursors with metal sources and nitrogenous materials together. An optimal means of including such together may involve use of complex cyanides of the metals, i.e. "Prussian blue" (iron hexacyanoferrate) or other hexacyanoferrates (e.g. those of potassium, sodium, ammonium or zinc, etc.) For iron-carbon-nitrogen incorporation, potassium hexacyanocobaltate (for cobalt-nitrogen incorporation), potassium tetracyanonickelate (for nickel-nitrogen incorporation), potassium hexacyanomanganate (for manganese-nitrogen incorporation), potassium hexa-cyanochromate (for chromium-nitrogen incorporation) and the like, as additives for the heat-treatment of the carbonaceous precursors. Alternatively, metal complexes such as iron phthalocyanine, copper (or other metals) phthalocyanines or porphyrins, iron dipyridyl complexes, and iron orthophenanthroline complexes, or ferrocenes (in conjunction with nitrogenous material) may serve as the simultaneous source of metals and nitrogen. In addition, metals or metal salts or oxides can be simultaneously incorporated into the carbon along with nitrogenous or sulfurous materials. Ferrocene and other sandwich compounds may serve as metal sources in such cases.

Another aspect of the present invention is the simultaneous incorporation of metal and sulfur ligation, as for example, heating coal with iron pyrites (pyrite, iron disulfide) or other metallic sulfides.

This procedure differs from the usual "impregnation" of an activated carbon with metal salts, which typically are effected at low temperature, and which leave the metal on the surface of the carbon, rather than incorporated into the graphitic sheets themselves, so as to provide an internal "electrode". Also, see U.S. Pat. No. 4,578,256, granted Mar. 25, 1986, and incorporated herein by reference.

Still another aspect of the invention is the use of highly activated carbons so made in cigarette filters to selectively oxidize or adsorb selected gas phase components.

The present invention provides catalytically active carbons having much greater throughput or oxidation potential than any currently available from coal. By hugely decreasing the contact times needed to effect oxidative transformations, less carbon is needed for a given application. Also, the precise levels or blends of metals may be rigorously controlled, providing a more uniform activity from batch to batch than currently seen with activated carbon.

Also, by being able to change the surface electron potential of an active carbon, enhanced or decreased affinity for selected classes of compounds with respect to simple adsorption by "ordinary" activated carbons is anticipated to be a benefit of this invention.

For catalytic purposes any of the following heavy metals will help such as Mg, Al, Si, P, Ti, V, Cr, Mn, Fe, Co, Ni, Cu, Zn, Y, Zr, Nb, Mo, La, Ce, other lanthanides, Hf, Ta, W, Pb and Bi. Excluded from the list of metals are those expected to be reduced to metal during the contemplated heat treatment. Those excluded include Au, Ag and Pt-metals.

What is claimed is:

1. A filter of a smoking article comprising catalytically active carbon impregnated with at least one heavy metal, and wherein the at least one heavy metal is incorporated within graghitic sheets of the catalytically active carbon, and further including sulfur or nitrogen ligation of the at least one incorporated metal contained within the active carbon.

2. A method of filtering smoke of a smoking article including the steps of establishing a flow of mainstream tobacco smoke, passing the mainstream tobacco smoke through a filter comprising catalytically active carbon impregnated with at least one heavy metal, and wherein the at least one heavy metal is incorporated within graphitic sheets of the catalytically active carbon, and further including sulfur or nitrogen ligation of the at least one incorporated metal contained within the active carbon, and selectively oxidizing or absorbing selected gas phase components from the smoke.

3. A smoking article comprising a tobacco rod and a filter element including catalytically active carbon impregnated with at least one heavy metal, and wherein the at least one heavy metal is incorporated within graphitic sheets of the catalytically active carbon, and further including sulfur or nitrogen ligation of the at least one incorporated meal contained within the active carbon.

4. An activated carbon comprising catalytically active carbon impregnated with at least one heavy metal, and wherein the at least one heavy metals is incorporated within graphitic sheets of the catalytically active carbon, and further including sulfur or nitrogen ligation of the at least one incorporated metal contained within the active carbon.

5. An activated carbon as in claim 4 wherein the heavy metal is selected from the group consisting of Mg, Al, Si, P, Ti, V, Cr, Mn, Fe, Co, Ni, Cu, Zn, Y, Zr, Nb, Mo, La, Ce, other lanthanides, Hf, Ta, W, Pb and Bi.

6. An activated carbon as in claim 4 including catalytically active carbon produced by heat treatment of carbon in the presence of heavy metals and nitrogen or sulfurous materials.

* * * * *

UNITED STATES PATENT AND TRADEMARK OFFICE
CERTIFICATE OF CORRECTION

PATENT NO.    : 6,789,547 B1
DATED         : September 14, 2004
INVENTOR(S)   : John B. Paine, III It is certified that error appears in the above-identified patent and that said Letters Patent is hereby corrected as shown below:

Column 4,
Line 52, "graghitic" should read -- graphitic --.

Column 5,
Line 8, "metals" should read -- metal --.

Column 6,
Line 7, "nitrogen" should read -- nitrogenous --.

Signed and Sealed this

Seventh Day of December, 2004

JON W. DUDAS
*Director of the United States Patent and Trademark Office*